United States Patent [19]
Salyer

[11] Patent Number: 6,116,330
[45] Date of Patent: Sep. 12, 2000

[54] HEAT STORAGE SYSTEM UTILIZING PHASE CHANGE MATERIALS GOVERNMENT RIGHTS

[75] Inventor: Ival O. Salyer, Dayton, Ohio

[73] Assignee: The University of Dayton, Dayton, Ohio

[21] Appl. No.: 09/338,717

[22] Filed: Jun. 23, 1999

[51] Int. Cl.[7] .................................................. F25B 29/00
[52] U.S. Cl. .................... 165/48.2; 165/10; 165/104.21; 252/70
[58] Field of Search ............................ 165/48.2, 104.21, 165/10, 140, 145, 150; 252/70

[56] References Cited

U.S. PATENT DOCUMENTS

| | | | |
|---|---|---|---|
| 4,037,650 | 7/1977 | Randall | 165/10 X |
| 4,169,554 | 10/1979 | Camp . | |
| 4,237,023 | 12/1980 | Johnson et al. | 252/70 |
| 4,258,696 | 3/1981 | Gopal | 165/10 X |
| 4,270,523 | 6/1981 | Van Neel | 165/10 X |
| 4,471,834 | 9/1984 | Schlote | 165/10 X |
| 4,556,100 | 12/1985 | Whitman | 165/10 |
| 4,681,154 | 7/1987 | Yano et al. | 165/10 X |
| 4,809,771 | 3/1989 | Kennel et al. | 165/10 |
| 4,911,232 | 3/1990 | Colvin et al. | 165/10 X |
| 5,211,949 | 5/1993 | Salyer | 257/70 X |
| 5,507,337 | 4/1996 | Rafalovich et al. . | |
| 5,765,389 | 6/1998 | Salyer . | |
| 5,806,511 | 9/1998 | Hart | 165/104.21 X |

FOREIGN PATENT DOCUMENTS

| | | | |
|---|---|---|---|
| 3114270 | 11/1982 | Germany | 165/10 |
| 54-0146054 | 11/1979 | Japan | 165/10 |

*Primary Examiner*—Christopher Atkinson
*Attorney, Agent, or Firm*—Killworth, Gottman, Hagan & Schaeff LLP

[57] ABSTRACT

A thermal energy transport and storage system is provided which includes an evaporator containing a mixture of a first phase change material and a silica powder, and a condenser containing a second phase change material. The silica powder/PCM mixture absorbs heat energy from a source such as a solar collector such that the phase change material forms a vapor which is transported from the evaporator to the condenser, where the second phase change material melts and stores the heat energy, then releases the energy to an environmental space via a heat exchanger. The vapor is condensed to a liquid which is transported back to the evaporator. The system allows the repeated transfer of thermal energy using the heat of vaporization and condensation of the phase change material.

26 Claims, 1 Drawing Sheet

HEAT STORAGE SYSTEM UTILIZING PHASE CHANGE MATERIALS

GOVERNMENT RIGHTS

GOVERNMENT RIGHTS

The Government has rights in this invention pursuant to Contract No. 19X-SC542C awarded by the Department of Energy.

BACKGROUND OF THE INVENTION

The present invention relates to an improved heat storage system, and more particularly, to a such a system which utilizing phase change materials to repeatedly absorb, store, and release thermal energy.

A great deal of interest exists in phase change thermal energy storage systems because of the inherent ability of phase change materials to store, absorb and release large quantities of heat to their surrounding environment as temperatures drop below or exceed predetermined levels. These systems are particularly of interest in architectural and building trades where climate control and its concomitant energy consumption is one of the principal considerations in building design and material selection.

A variety of building materials and techniques which incorporate phase change materials have previously been used to conserve heat or cool and thereby reduce energy costs. For example, phase change materials have been incorporated into concrete such that energy in excess of that necessary to obtain comfort conditions is inherently absorbed and released as required to maintain the comfort range. Thus, in winter months, phase change materials incorporated into the concrete floors or walls of buildings absorb and store solar energy during daylight hours and release it to the interior at night as temperatures decrease. In the summer months, the same phase change materials, due to their thermostatic character, conserve coolness by absorbing cool from the night air and releasing it during the day.

In recent years, it has been recognized that phase change materials may also be utilized in heat pumps and/or air conditioning systems. For example, Rafalovich et al., U.S. Pat. No. 5,507,337 teach a heat pump and air conditioning system utilizing a refrigerant circuit, a heat exchanger, and a thermal storage device including a first and second phase change materials having different melt temperatures. Camp, U.S. Pat. No. 4,169,554 teaches a solar powered heating and cooling system incorporating a heat pump which utilizes phase change materials such as waxes or paraffins to absorb and store heat energy. Salyer, U.S. Pat. No. 5,765,389 teaches a cooling unit including a heat exchange unit which contains a phase change material.

As water in the liquid-to-vapor phase change is one of the most energetic thermal energy storage materials known (545 cal/g), there is a strong desire to use the heat of vaporization and crystallization of water over other phase change materials since its heat of vaporization is significantly higher. It would be desirable to be able to condense the steam generated in the liquid-to-vapor transition and use the high heat of condensation for heating applications. However, the large change in volume which accompanies the change in state of water from a liquid to a gas necessitates the use of large, pressure-resistant containers which are heavy and expensive.

Accordingly, there is still a need in the art for a low cost, efficient system for storing and transport of large amounts of thermal energy which avoids pressure build-up.

SUMMARY OF THE INVENTION

The present invention meets those needs by providing a low-cost heat storage system for storing and transport of thermal energy which utilizes the high heat of evaporation of a phase change material such as water in a phase change material/silica dry powder mixture to absorb heat from an energy source and transport it to a separate container containing a second phase change material where the heat energy is stored and released into the environment as needed. The system of the present invention allows repeated cycling of vapor and liquid between separate panels or containers without pressure build-up, thus eliminating the need for heavy pressure-resistant containers.

According to one aspect of the present invention, a thermal energy transport and storage system is provided comprising a first container containing a mixture of a first phase change material and silica powder. The mixture preferably comprises about 65% by weight of the phase change material and about 35% by weight silica. The phase change material is preferably selected from the group consisting of water, glycol, methanol, ethanol, propanol, butanol, and mixtures thereof The phase change material preferably comprises water. Preferred silicas include hydrophilic fumed or precipitated silicas having a particle size range from 0.005 to 0.025 microns, and having surface areas ranging from 50 to 500 $m^2/g$.

The phase change material in the silica powder/phase change mixture is adapted to absorb heat energy from an energy source. The energy source preferably comprises solar energy but may comprise other suitable energy sources. The first container is generally referred to herein as an evaporator as heat from the energy source causes the phase change material to reach its boiling point and convert from a liquid to a vapor. The inclusion of silica in the mixture allows the phase change material to reach its boiling point at a lower temperature, thereby providing efficient energy conversion.

The system further comprises a second container, generally referred to herein as a condenser, which contains a second phase change material which is adapted to store and release the thermal energy absorbed by the first phase change material and convert the second phase change material from a solid to a liquid and from a liquid to a solid. The second phase change material preferably has a melting point of between about 50 to 80° C. The second phase change material may comprise crystalline alkyl hydrocarbons or linear crystalline primary alcohols. Another phase change material which may be used in the condenser is a solidified melt mixture of a linear crystalline alkyl hydrocarbon phase change material, a polyolefin resin, an ethylene copolymer, and silica particles. In a preferred embodiment, the second phase change material is contained in crosslinked high density polyethylene pellets.

The system further includes first and second tubes connected between the first and second containers, where the first tube is adapted to transport vapor from the evaporator to the condenser, and the second tube is adapted to transport liquid from the condenser to the evaporator.

The system also preferably includes a heat exchanger which is connected to the second container and which functions to distribute stored thermal energy from the second phase change material to an environmental space.

When the system is in use, the energy source heats the phase change material (preferably water) to its boiling point and causes evaporation of the water from the water-silica powder mixture in the evaporator. The vapor from the evaporator is then transported through the first tube to the condenser which contains the second phase change material. The second phase change material then melts to a liquid form, storing heat. Upon changing back to a solid state, the stored heat energy is released via the heat exchanger into a living space and the vapor is condensed in liquid form which is transported back to the evaporator, resulting in a continuous operation. The system of the present invention may be used in both commercial and residential heating and cooling applications.

Accordingly, it is a feature of the present invention to provide a thermal energy transport and storage system which utilizes phase change materials to repeatedly absorb, store and release thermal energy. This, and other features and advantages of the present invention will become apparent from the following detailed description, the accompanying drawings, and the appended claims.

DETAILED DESCRIPTION OF THE PREFERRED EMBODIMENT

Figure 1:
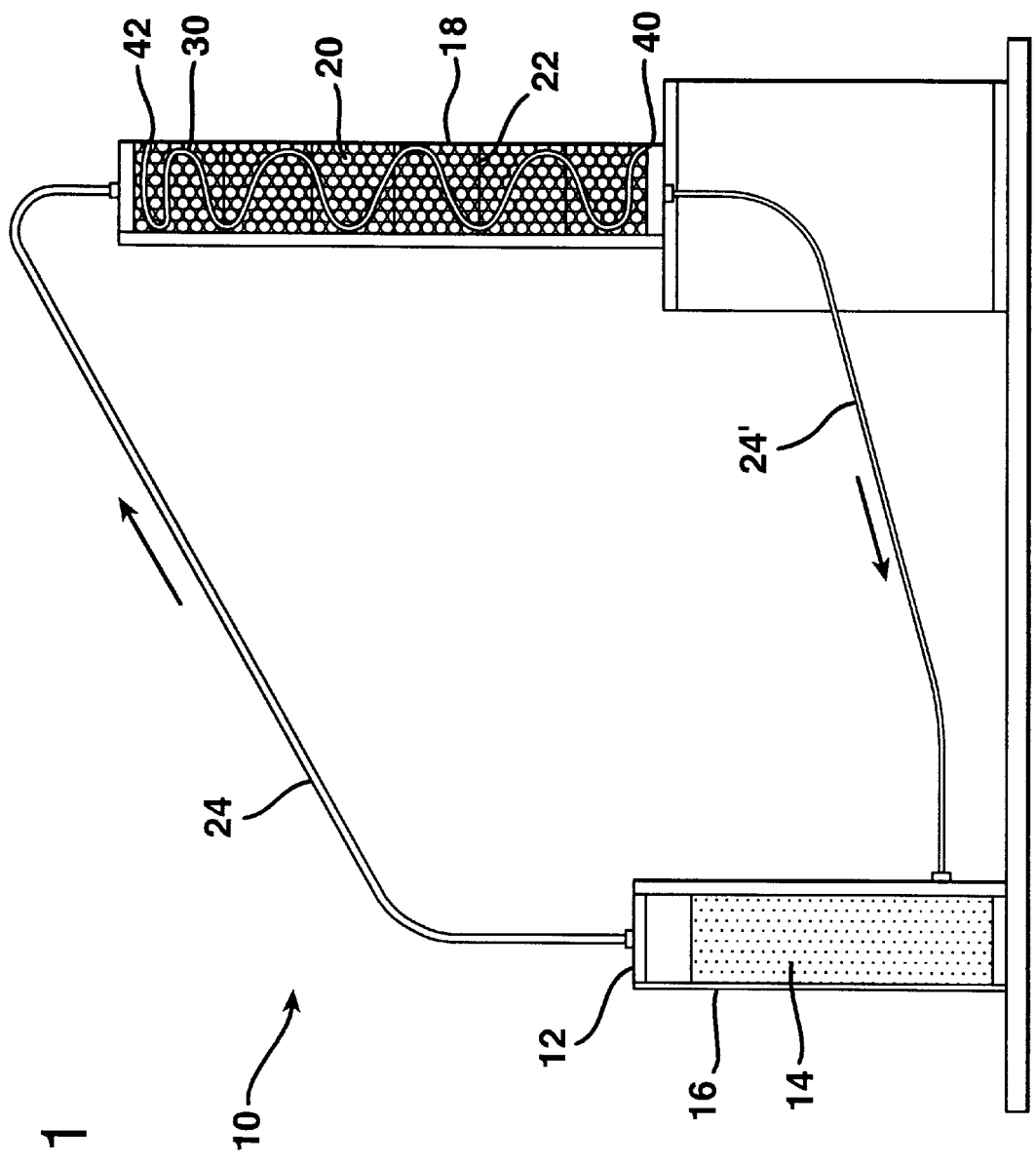
FIG. 1 is a schematic illustration of the system of the present invention.

The system of the present invention provides an advantage over previous systems in that it allows the repeated vaporization and condensation of water or other phase change materials between two separate containers without pressure build-up, thus avoiding the need for heavy pressure-resistant construction. The system is highly efficient as the use of silica powder with water in the evaporator effectively reduces the boiling temperature of the water significantly below 100° C. (e.g., about 85° C.). By lowering the boiling point of water without reducing the pressure, a lower temperature is able to change the state of the water from a liquid to a vapor (steam). Further, the inclusion of silica allows the reversible absorption and desorption of the phase change material, allowing the system to undergo repeated evaporation and condensation cycles.

While water is the preferred phase change material for use with the silica powder, other phase change materials may be used including glycol, methanol, propanol, ethanol, butanol, and mixtures thereof The preferred energy source in the present invention is solar energy which may be collected using a solar collector. The solar collector may comprise a flat-plate solar collector or other conventional solar collection device. While solar collectors are preferred for use in the present invention, it should be appreciated that other available energy sources such as electrical resistance heating may be used.

The preferred silicas for use in the present invention are fumed or precipitated hydrophilic silicas having a particle size of about 0.005 to 0.025 microns and a surface area of 100 $m^2$ or more. An example is ABS silica from PPG Industries of Pittsburgh, Pa., which is a normal, hydrophilic silica having a surface area of 150 $m^2$/gram and a particle size of about 0.022 microns. Other suitable silicas include Cabot EH-5 silica available from Cabot Corporation, which has a surface area of 350 $m^2$/gram, and LS-500 available from DeGussa, which has a surface area of 500 $m^2$.

In embodiments where the solar collector is transparent to the phase change/silica mixture, it may be desirable to increase radiant heat absorption by coloring the silica black with dyes or with a small amount of carbon black. In such an embodiment, the mixture would preferably comprise about 60–65% by weight of the phase change material, about 25–35% by weight silica, and about 1–20% by weight carbon black.

Preferred phase change materials for use in the condenser portion of the system include crystalline alkyl hydrocarbons having a chain length of C 18 or greater and having a melting point of from about 50 to 80° C. Preferred commercially available waxes include Shellwaxe® 300 (MP 60°–65° C.) available from Shell Oil Co.; Boron R-152 (MP 65° C.), a producing of Standard Oil of Ohio (SOHIO); Union SR-143 (MP about 61° C.), a product of Union Oil Co.; Aristowax® 143 (MP 34°–61° C.), and Paraffin 150 (MP about 61° C.). These waxes have heats of fusion greater than 30 cal/g and are relatively inexpensive. Other commercially available waxes include Parvan 127, 137, and 147 (MP about 53° C. to 64° C.) available from Exxon.

Other phase change materials which are suitable for use in the condenser include linear crystalline primary alcohols available under the designations EPAL 16, EPAL 18 and EPAL 20 from Amoco. Stearic acid (MT about 69.6° C.), behemic acid (MT about 80° C.) and stearic anhydride (MT about 71° C.) are also suitable phase change materials for use in the condenser.

An alternative phase change material which may be used in the condenser is a solidified melt mixture of a linear crystalline alkyl hydrocarbon phase change material, a polyolefin resin, an ethylene copolymer, and silica particles. The melt mix preferably comprises, based on the total weight of the composite, about 60% phase change material, about 16% by weight high density polyethylene, about 8% by weight of an ethylene-vinyl acetate copolymer, and about 16% by weight silica particles. Such a melt mix is disclosed in U.S. Pat. No. 5,565,132, the disclosure of which is hereby incorporated by reference.

Referring now to FIG. 1, the heat storage system 10 of the present invention is illustrated. The system includes an evaporator 12 containing a silica powder/phase change mixture 14. The evaporator may have a transparent glass front for purposes of solar heating such as with a solar collector 16, or it may utilize an uninsulated metal front.

The system further includes a condenser 18 which includes the second phase change material. In the embodiment shown, the phase change material is contained within crosslinked high density polyethylene pellets 20. The condenser preferably further includes a wire screen 22 covering the pellets to help distribute heat.

The system further includes a heat exchanger within the second container for removing stored heat from the condenser into an environmental space. The heat exchanger may comprise a conventional copper coil 30 as shown which includes a heat exchange fluid therein such as water, ethylene glycol, or mixtures thereof As shown, the heat exchange fluid is pumped into the coil via entrance 40 and exits through exit 42 where it may be processed through a secondary heat exchanger (not shown) which releases the heat to the environment in the form of heated air. If desired, air may be circulated through the heat exchanger rather than fluid such that heated air can be released directly to the environment from the heat exchanger 30.

Alternatively, the heat exchanger may comprise a shell and tube type heat exchanger (not shown) which utilizes a plurality of heat exchange tubes formed from a heat conducting material such as copper. The shell and tube heat exchanger is preferably used in embodiments where the second phase change material comprises a melt mix.

The system also includes tubing 24 for transporting vapor from the evaporator to the condenser and tubing 24' which transports liquid from the condenser back to the evaporator. The tubing may be comprised of any suitable material such as metal or plastic and is preferably insulated. The tubing extending from the evaporator to the condenser is preferably about ½ to 2 inches in diameter, and the tubing extending from the condenser to the evaporator is about ¼ to ½ inches in diameter.

In operation, the heat from the solar collector 16 causes the silica/water phase change mixture 14 to heat to a lowered boiling point of about 85° C. such that vapor is formed and transported from the evaporator 12 to the condenser 18 via tubing 24, where the heated vapor melts the second phase change material in the pellets 20 such that the phase change material stores heat. The stored heat in turn is transferred from the phase change material to the heat exchanger 30 where it is eventually released to the environment. Upon changing back to a solid state, the phase change material in the pellets condenses the vapor to liquid water which is transported back to the evaporator via tubing 24'. The water wicks up the silica powder and the system undergoes repeated evaporation and condensation cycles.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A thermal energy transport and storage system comprising
a first container containing a mixture of a first phase change material and silica powder, said phase change material being adapted to absorb thermal energy from an energy source and convert from a liquid to a vapor;
a second container containing a second phase change material, said second phase change material adapted to store and release said thermal energy absorbed by said first phase change material and convert from a solid to a liquid and from a liquid to a solid; and
first and second tubes connected between said first and second containers, said first tube adapted to transport vapor from said first container to said second container and said second tube adapted to transport liquid from said second container to said first container.

2. The system of claim 1 further including a heat exchanger connected to said second is container for distributing stored thermal energy from said second phase change material in said second container to an environmental space.

3. The system of claim 1 in which said mixture comprises about 65% by weight of said phase change material and about 35% by weight silica.

4. The system of claim 3 wherein said mixture further comprises about 1–20% by weight carbon black.

5. The system of claim 1 wherein said first phase change material is selected from the group consisting of water, glycol, methanol, propanol, ethanol, butanol, and mixtures thereof.

6. The system of claim 1 wherein said first phase change material comprises water.

7. The system of claim 1 wherein said energy source comprises solar energy.

8. The thermal energy transport and storage system of claim 1 wherein said silica particles have a surface area of between about 50 $m^2/g$ and about 500 $m^2/g$.

9. The system of claim 1 in which said second phase change material has a melting point of between about 50 to 80° C.

10. The system of claim 1 in which said second phase change material comprises a crystalline alkyl hydrocarbon.

11. The system of claim 1 wherein said second phase change material comprises a linear crystalline primary alcohol.

12. The system of claim 1 wherein said second phase change material comprises a melt mixture of a linear crystalline alkyl hydrocarbon phase change material, a polyolefin resin, an ethylene copolymer, and silica particles.

13. The system of claim 12 wherein said melt mixture comprises from about 60% by weight of said phase change material, about 16% by weight of high density polyethylene, about 8% by weight of an ethylene-vinyl acetate copolymer, and about 16% by weight silica particles.

14. The system of claim 1 wherein said second phase change material is contained in crosslinked high density ethylene pellets.

15. A method for continuously transporting and storing thermal energy comprising the steps of:
providing a mixture of a first phase change material and silica powder in a first container;
providing a source of thermal energy such that said first phase change material absorbs said thermal energy and converts from a liquid to a vapor;
providing a second phase change material in a second container;
transporting vapor from said first container to said second container such that said second phase change material stores and releases thermal energy absorbed by said first phase change material and converts from a solid to a liquid and from a liquid to a solid; and
transporting said liquid from said second container to said first container.

16. The method of claim 15 in which said mixture comprises about 65% by weight of said phase change material and about 35% by weight silica.

17. The method of claim 16 wherein said mixture further comprises from about 1–20% by weight carbon black.

18. The method of claim 15 wherein said first phase change material is selected from the group consisting of water, glycol, methanol, propanol, ethanol, butanol, and mixtures thereof.

19. The method of claim 15 wherein said first phase change material comprises water.

20. The method of claim 15 wherein said energy source comprises solar energy.

21. The method of claim 15 wherein said silica particles have a surface area of between about 50 $m^2/g$ and about 500 $m^2/g$.

22. The method of claim 15 in which said second phase change material has a melting point of between about 50 to 80° C.

23. The method of claim 15 in which said second phase change material comprises a crystalline alkyl hydrocarbon.

24. The method of claim 15 wherein said second phase change material comprises a linear crystalline primary alcohol.

25. The method of claim 15 wherein said second phase change material comprises a melt mixture of a linear crystalline alkyl hydrocarbon phase change material, a polyolefin resin, an ethylene copolymer, and silica particles.

26. The method of claim 15 wherein said second phase change material is contained in crosslinked pellets of high density polyethylene.

* * * * *